(12) United States Patent
Bolte et al.

(10) Patent No.: US 6,903,167 B2
(45) Date of Patent: Jun. 7, 2005

(54) POLYURETHANE PREPOLYMERS COMPRISING NCO GROUPS AND A LOW CONTENT OF MONOMERIC POLYISOCYANATE

(75) Inventors: Gerd Bolte, Monhelm (DE); Guenter Henke, Neuss (DE); Claudia Meckel-Jonas, Neuss (DE); Dagmar Jahns, Essen (DE)

(73) Assignee: Henkel Kommanditgesellschaft auf Aktien (Henkel KGAA), Duesseldorf (DE)

( * ) Notice: Subject to any disclaimer, the term of this patent is extended or adjusted under 35 U.S.C. 154(b) by 0 days.

(21) Appl. No.: 10/448,849

(22) Filed: May 30, 2003

(65) Prior Publication Data

US 2004/0014847 A1 Jan. 22, 2004

Related U.S. Application Data

(63) Continuation of application No. PCT/EP01/14324, filed on Dec. 6, 2001.

(30) Foreign Application Priority Data

Dec. 15, 2000 (DE) ......................................... 100 62 583
Dec. 15, 2000 (DE) ......................................... 100 62 584
Dec. 15, 2000 (DE) ......................................... 100 62 587

(51) Int. Cl.$^7$ ............................................. C08G 18/10
(52) U.S. Cl. ......................... 525/458; 528/59; 528/905; 252/182.22; 156/331.4
(58) Field of Search ....................... 252/182.22; 528/59, 528/905; 525/458; 156/331.4

(56) References Cited

U.S. PATENT DOCUMENTS

| 4,910,332 A | 3/1990 | Kahl et al. |
| 4,929,667 A | * 5/1990 | Ban et al. ................... 524/718 |
| 5,654,390 A | * 8/1997 | Gajewski et al. ............. 528/63 |
| 5,747,628 A | 5/1998 | Schmalstieg et al. |
| 5,998,538 A | 12/1999 | Meckel et al. |
| 6,515,164 B1 | 2/2003 | Bolte et al. |

FOREIGN PATENT DOCUMENTS

| CA | 2 309 593 | 5/1999 |
| DE | 953 012 | 11/1956 |
| DE | 37 39 261 A1 | 6/1989 |
| DE | 41 40 660 A1 | 6/1993 |
| DE | 42 32 015 A1 | 3/1994 |
| EP | 0 019 120 A1 | 11/1980 |
| EP | 0 107 014 A1 | 5/1984 |
| EP | 0 590 398 A1 | 4/1994 |
| WO | WO 97/46603 A1 | 12/1997 |
| WO | WO 98/29466 A1 | 7/1998 |
| WO | WO 99/24486 A1 | 5/1999 |

OTHER PUBLICATIONS

MAK–Wert–Liste der Technischen Regel TRGS 900 des Bundesministeriums Arbeit und Soziales, Oct., 2000.
Bundesinstitut fur gesundheitlichen Vergraucherschutz und Veterinarmedizin, BGVV, nach amtlicher Sammlungv on Untersuchungsverfahren nach §35 LMBG—Untersuchung von Lebensmitten/Bestimmung von primaren aromatischen Aminen in waBrigen Pruflebensmitteln, Jan. 1995.
G. W. Becker, "Polyurethane" Kunststoff–Handbuch, 3$^{rd}$ Edition, vol. 7, (Herausgeber), Hanser–Verlag, Munchen, pp. 425–429 (1993).
Deutsche Lebensmittel Rundschau, vol. 87, pp. 280 and 281 (1991).

* cited by examiner

Primary Examiner—Rachel Gorr
(74) Attorney, Agent, or Firm—Woodcock Washburn LLP

(57) ABSTRACT

Polyurethane prepolymers containing NCO (isocyanate) groups and having a low content of monomeric polyisocyanate, processes for their production and uses employing these prepolymers. The polyurethane prepolymers of the invention are produced from by a reaction employing monomeric polyisocyanates and polyols.

17 Claims, No Drawings

POLYURETHANE PREPOLYMERS COMPRISING NCO GROUPS AND A LOW CONTENT OF MONOMERIC POLYISOCYANATE

CROSS-REFERENCE TO RELATED APPLICATIONS

This application is a continuation under 35 USC 365(c) and 35 USC 120 of international application PCT/EP01/14324, filed on Dec. 6, 2001, the international application not being published in English. This application also claims priority under 35 USC 119 to DE 100 62 587.8, filed on Dec. 15, 2000, DE 100 62 583.5, filed on Dec. 15, 2000 and DE 100 62 584.3, filed on Dec. 15, 2000.

BACKGROUND OF THE INVENTION

This invention relates to a polyurethane (PU) prepolymer containing isocyanate (NCO) groups and having a low content of monomeric polyisocyanate, to its production and to its use.

Polyurethane prepolymers containing NCO groups, preferably terminal NCO groups, have been known for some time. They may readily be chain-extended or crosslinked with suitable hardeners—generally polyhydric alcohols—to form high molecular weight materials. Polyurethane prepolymers have acquired significance in many fields of application, for example in the production of adhesives, coatings, casting resins and molded articles.

In order to obtain NCO-terminated PU prepolymers, it is common practice to react polyhydric alcohols with an excess of monomeric polyisocyanates—generally at least predominantly diisocyanates. The molecular weight can be at least approximately controlled through the ratio of OH groups to isocyanate groups. Thus, a ratio of OH groups to isocyanate groups of or approaching 1:1 generally leads to high molecular weights. However, with a ratio of about 2:1, for example, where diisocyanates are used, a statistical average of one diisocyanate molecule is attached to each OH group so that, ideally, no oligomerization or chain extension occurs during the reaction.

In practice, however, such chain extending reactions cannot be suppressed with the result that, at the end of the reaction, a certain amount of the component used in excess is left over, irrespective of the reaction time.

If, for example, a diisocyanate is used as the excess component in the reaction of diisocyanates with polyhydric alcohols, generally at least predominantly diols, and if the isocyanate groups of the diisocyanate have substantially the same reactivity, around 25% of the monomeric diisocyanate used remains as monomer in the prepolymer according to the Schulz-Flory statistic, for example for an NCO/OH reaction ratio of 2:1.

The presence of monomeric polyisocyanate is problematical, for example, when readily volatile diisocyanates have been used as the monomeric polyisocyanate. Adhesives/sealants and, in particular, PU-based hotmelt adhesives are applied at elevated temperature. Thus, the application temperatures of hotmelt adhesives are in the range from 100° C. to 200° C. while those of laminating adhesives are in the range from room temperature to 150° C. Even at room temperature, volatile diisocyanates, such as IPDI or TDI, have a significant vapor pressure. This significant vapor pressure is serious above all in the case of spray application because, in this case, significant quantities of isocyanate vapors can occur over the application unit. Isocyanate vapors are toxic in view of their irritating and sensitizing effect. The use of products with a high content of readily volatile diisocyanates involves elaborate measures on the part of the user to protect the people responsible for applying the product, more particularly elaborate measures for keeping the surrounding air fit to inhale, as legally stipulated by the maximum permitted concentration of working materials as gas, vapor or particulates in the air at the workplace (annually updated "MAK-Wert-Liste der Technischen Regel TRGS 900 des Bundesministeriums für Arbeit und Soziales").

Since protective and cleaning measures generally involve considerable financial investment or costs, there is a need on the part of the user for products which—depending on the isocyanate used—have a low content of readily volatile diisocyanates.

"Readily volatile" substances in the context of the present specification are substances which have a vapor pressure of more than about 0.0007 mm Hg at 30° C. or a boiling point of less than about 190° C. (70 mPa).

If low-volatility diisocyanates, more particularly the widely used bicyclic diisocyanates, for example diphenylmethane diisocyanates, are used instead of the high-volatility diisocyanates, the PU prepolymers or adhesives based thereon generally obtained have viscosities that are normally outside the range relevant to simple methods of application. This also or additionally happens where it is intended to reduce the monomer content by reducing the NCO:OH ratio. In these cases, the viscosity of the polyurethane prepolymers can be reduced by addition of suitable solvents, but this goes against the general demand for no solvents. Another way of reducing viscosity without using solvents is to add an excess of monomeric polyisocyanates as so-called reactive diluents. These reactive diluents are incorporated in the coating or bond in the course of a subsequent hardening process (after addition of a hardener or by hardening under the effect of moisture).

Although the viscosity of the polyurethane prepolymers can actually be reduced in this way, the generally incomplete reaction of the reactive diluent and or, generally, the presence of monomeric unreacted starting polyisocyanate often leads to the presence in the bond or coating of free monomeric polyisocyanates which are capable of "migrating", for example, within the coating or bond or, in some cases, even into the coated or bonded materials. Such migrating constituents are commonly known among experts as "migrates". By contact with moisture, the isocyanate groups of the migrates are continuously reacted to amino groups. The content of the amines, particularly primary aromatic amines, thus formed must be below the detection limit—based on aniline hydrochloride—of 0.2 micrograms aniline hydrochloride/100 ml sample (Bundesinstitut für gesundheitlichen Verbraucherschutz und Veterinärmedizin, BGVV, nach amtlicher Sammlung von Untersuchungsverfahren nach § 35 LMBG—Untersuchung von Lebensmitteln/Bestimmung von primären aromatischen Aminen in wässrigen Prüflebensmitteln).

Migrates are undesirable in the packaging industry and particularly in the packaging of foods. On the one hand, the passage of the migrates through the packaging material can lead to contamination of the packaged product; on the other hand, long waiting times are necessary—depending on the quantity of migratable free monomeric polyisocyanate—before the packaging material is "migrate-free" and can be used.

Another unwanted effect which can be caused by the migration of monomeric polyisocyanates is the so-called antisealing effect in the production of bags or carrier bags from laminated plastic film. The laminated plastic films often contain a lubricant based on fatty acid amides. By reaction of migrated monomeric polyisocyanate with the fatty acid amide and/or moisture, urea compounds with a melting point above the sealing temperature of the plastic films are formed on the surface of the film. This leads to the formation between the films to be sealed of a "foreign" antisealing layer which counteracts the formation of a homogeneous sealing seam.

However, problems are caused not only by the use, but also the by the marketing of reactive adhesives containing monomeric polyisocyanate. In connection with consumer protection, safety and occupational hygiene, the obligation to identify isocyanate-containing products was made even more strict as from 1 Jun. 2000. Thus, substances and preparations containing, for example, more than 0.1% free MDI or TDI come under the law on hazardous materials and have to be identified accordingly. The obligation to do so involves special measures for packaging and transportation.

Methods of obtaining PU prepolymers with a low percentage content of monomeric polyisocyanate, generally monomeric starting diisocyanate, and optionally avoiding the above-described disadvantages or improving the physiological properties of PU-based adhesives are known.

DE-PS 953 012 describes a process for the production of soluble, relatively high molecular weight polyisocyanates capable of further reaction. In this process, polyhydric, low molecular weight alcohols are reacted with such quantities of diisocyanates that, for every hydroxyl group, there are more than one and less than two isocyanate groups. The particular value of these new polyisocyanates is that, by virtue of their relatively high molecular weight, they show hardly any vapor pressure and are therefore physiologically harmless. Suitable polyalcohols are inter alia ethylene glycol, hexanediol, diethylene glycol, methyl hexanol. The diisocyanates mentioned include 4,4'-diphenylmethane diisocyanate, hexamethylene diisocyanate, toluene diisocyanate.

DE 37 39 261 A1 relates to a process for the production of polyisocyanates containing urethane groups by reacting aromatic diisocyanates with polyhydric alcohols having a molecular weight of 62 to 250 and subsequently removing the unreacted excess starting diisocyanate by special distillation. 2,4-Diisocyanatotoluene or technical mixtures thereof with 2,6-diisocyanatotoluene are preferably used as the diisocyanates. The end products of the process are distinguished by a particularly low content of free starting diisocyanate of under 0.3% by weight.

DE 41 40 660 A1 describes polyisocyanates containing ether and urethane groups which are produced by reacting polyhydroxy polyethers having a molecular weight of 350 to 500 with excess quantities of toluene diisocyanate and subsequently removing any unreacted excess of this starting diisocyanate by distillation to a residual content of less than 0.1% by weight.

DE 42 32 015 A1 describes solventless two-component polyurethane adhesive systems characterized by high early strength and low migration values based on hydroxyl polyesters and prepolymers containing isocyanate groups. The prepolymer containing isocyanate groups is prepared from polyether polyols with an average molecular weight of 400 to 1,500 and 2,4- or 2,6-toluene diisocyanates or mixtures thereof. The use of a large excess of toluene diisocyanate, i.e. an NCO to OH group ratio of greater than two, leads to prepolymers with a monomer content which, although high, can be reduced to below 0.15% by weight by distilling off or extracting the excess monomer, optionally using an inert entraining agent. Such prepolymers are distinguished by particularly low viscosities and an isocyanate content of 4 to 11% by weight.

WO 98/29466 describes a low-monomer PU prepolymer which is prepared in two reaction steps. In a first reaction step, a partly sluggishly reacting (nonsymmetrical) diisocyanate, preferably TDI, is reacted with polyhydric alcohols in an OH:NCO ratio of 4 to 0.55:1. After virtually all the fast NCO groups have reacted off with some of the OH groups present, a more reactive diisocyanate (symmetrical diisocyanate), preferably MDI, is added in less than the equivalent quantity, based on the still free OH groups, in a second reaction step.

EP 0 019 120 A1 describes a process for the production of elastic, weather-resistant flat materials using a moisture-curing prepolymer obtained by reacting equimolar quantities of a polyol, reducing the monomeric TDI content to below 1% by thin-layer distillation and then reacting the reaction product with diphenylmethane diisocyanate and a polyol. The prepolymer contains 5 to 15% by weight of free NCO groups.

Despite the prior art cited above, there was still a need for improved PU compositions with a low monomeric polyisocyanate content which would be migrate-free and, in particular, would have an optimal viscosity for the particular application envisaged, could be processed sufficiently quickly and safely and would be particularly suitable for use in the packaging industry.

DETAILED DESCRIPTION OF THE INVENTION

The solution to this problem as provided by the invention is defined in the claims and resides essentially in a polyurethane prepolymer with an NCO content of 2% by weight to 10% by weight (as determined by Spiegelberger's method, EN ISO 11909), an OH value of 0 and a monomeric polyisocyanate content of at most 2% by weight obtainable A) by mixing
  I) at least one reactive component (I) containing urethane groups with
  II) at least one low-monomer polyisocyanate (II) containing urethane groups, the low-monomer polyisocyanate (II) containing urethane groups being obtainable by reaction of
    at least one monomeric polyisocyanate with at least one polyol in an NCO:OH ratio of 2:1 to 10:1 and subsequently removing unreacted monomeric polyisocyanate,
    the percentage by weight of the reactive component (I) containing urethane groups in the mixture of component (I) and polyisocyanate (II) being in the range from 20 to 90% by weight,
B) and optionally reacting components (I) and (II).

Polyisocyanates (II) containing urethane groups in the context of the invention are understood to be compounds which are produced using monomeric polyisocyanates and polyols. Besides the polyols, additional compounds containing functional groups reactive to isocyanate groups may be used for the production of the polyisocyanates containing urethane groups.

The polyisocyanates (II) containing urethane groups contain at least two, preferably terminal, NCO groups.

The polyol component may contain only one polyol, although a mixture of two or more polyols may also be used as the polyol component. A polyol is understood to be a polyhydric alcohol, i.e. a compound containing more than one OH group in the molecule.

"Functional groups reactive to isocyanate groups" in the context of the present specification are understood to be functional groups which are capable of reacting with isocyanate groups at temperatures of up to 200° C., optionally in the presence of a catalyst, with formation of at least one covalent bond.

Suitable reactive functional groups can be monofunctional in the context of a reaction with isocyanates, for example OH groups or mercapto groups. However, they may also be difunctional in that context, for example amino groups. Accordingly, a molecule containing one amino group also has two functional groups reactive to isocyanate groups. It is not necessary in this connection for a single molecule to have two separate functional groups reactive to isocyanate groups. What is crucial is that the molecule containing two isocyanate groups is capable of entering into a combination with formation of a covalent bond.

Various polyols may be used as the polyol component. Examples of such polyols are aliphatic polyols containing 2 to 4 OH groups per molecule. These OH groups may be both primary and secondary OH groups. Suitable aliphatic polyols include, for example, ethylene glycol, propylene glycol, butane-1,4-diol, pentane-1,5-diol, hexane-1,6-diol, heptane-1,7-diol, octane-1,8-diol and higher homologs or isomers of the compounds mentioned, which are obtained in known manner from a step-by-step extension of the hydrocarbon chain by one $CH_2$ group at a time or by introducing branches into the carbon chain, or mixtures of two or more thereof. Other suitable polyols are alcohols of relatively high functionality, such as, for example, glycerol, trimethylol propane, pentaerythritol and oligomeric ethers of the substances mentioned on their own or in the form of a mixture of two or more of the ethers mentioned with one another.

Other suitable polyol components are reaction products of low molecular weight polyhydric alcohols with alkylene oxides, so-called polyethers. The alkylene oxides preferably contain 2 to 4 carbon atoms. Suitable polyether polyols are, for example, the reaction products of ethylene glycol, propylene glycol, the isomeric butanediols, hexanediols or 4,4'-dihydroxydiphenylpropane with ethylene oxide, propylene oxide or butylene oxide or mixtures of two or more thereof. Other suitable polyether polyols are products of the reaction of polyhydric alcohols, such as glycerol, trimethylol ethane or trimethylol propane, pentaerythritol or sugar alcohols or mixtures of two or more thereof, with the alkylene oxides mentioned to form polyether polyols. Polyether polyols with a molecular weight of about 100 to about 10,000 and preferably in the range from about 200 to about 5,000 are particularly suitable. Thus, depending on the desired molecular weight, products of the addition of only a few mol ethylene oxide and/or propylene oxide per mol or of more than one hundred mol ethylene oxide and/or propylene oxide onto low molecular weight polyhydric alcohols may be used. Other polyether polyols are obtainable by condensation of, for example, glycerol or pentaerythritol with elimination of water. In addition, polyols widely used in polyurethane chemistry are obtainable by polymerization of tetrahydrofuran. Among the polyether polyols mentioned, products of the reaction of polyhydric low molecular weight alcohols with propylene oxide under conditions where at least partly secondary hydroxyl groups are formed are particularly suitable.

The polyethers are obtained in known manner by reacting the starting compound containing a reactive hydrogen atom with alkylene oxides, for example ethylene oxide, propylene oxide, butylene oxide, styrene oxide, tetrahydrofuran or epichlorohydrin or mixtures of two or more thereof. Suitable starting compounds are, for example, water, ethylene glycol, 1,2- or 1,3-propylene glycol, 1,4- or 1,3-butylene glycol, 1,6-hexanediol, 1,8-octanediol, neopentyl glycol, 1,4-hydroxymethyl cyclohexane, 2-methylpropane-1,3-diol, glycerol, trimethylol propane, hexane-1,2,6-triol, butane-1,2,4-triol, trimethylol ethane, pentaerythritol, mannitol, sorbitol, methyl glycosides, sugars, phenol, isononyl phenol, resorcinol, hydroquinone, 1,2,2- or 1,1,2-tris-(hydroxyphenyl)-ethane, ammonia, methyl amine, ethylenediamine, tetra- or hexamethylenediamine, triethanolamine, aniline, phenylenediamine, 2,4- and 2,6-diaminotoluene and polyphenyl polymethylene polyamines which can be obtained by condensing aniline with formaldehyde or mixtures of two or more thereof.

Polyethers modified by vinyl polymers are also suitable for use as the polyol component. Products such as these are obtainable, for example, by polymerizing styrene or acrylonitrile or mixtures thereof in the presence of polyethers.

Other suitable polyol components are polyester polyols with a molecular weight of about 200 to about 10,000. For example, polyester polyols obtained by reaction of low molecular weight alcohols, more particularly ethylene glycol, diethylene glycol, neopentyl glycol, hexanediol, butanediol, propylene glycol, glycerol or trimethylol propane, with caprolactone may be used. Other suitable polyhydric alcohols for the production of polyester polyols are 1,4-hydroxymethyl cyclohexane, 2-methylpropane-1,3-diol, butane-1,2,4-triol, triethylene glycol, tetraethylene glycol, polyethylene glycol, dipropylene glycol, polypropylene glycol, dibutylene glycol and polybutylene glycol.

Other suitable polyester polyols are obtainable by polycondensation. Thus, dihydric and/or trihydric alcohols may be condensed with less than the equivalent quantity of dicarboxylic and/or tricarboxylic acids or reactive derivatives thereof to form polyester polyols. Suitable dicarboxylic acids are, for example, adipic acid or succinic acid and higher homologs thereof containing up to 16 carbon atoms, unsaturated dicarboxylic acids, such as maleic acid or fumaric acid, and aromatic dicarboxylic acids, more particularly the isomeric phthalic acids, such as phthalic acid, isophthalic acid or terephthalic acid. Suitable tricarboxylic acids are, for example, citric acid or trimellitic acid. The acids mentioned may be used individually or in the form of mixtures of two or more thereof. Polyester polyols of at least one of the dicarboxylic acids mentioned and glycerol which have a residual content of OH groups are particularly suitable for the purposes of the invention. Particularly suitable alcohols are hexanediol, ethylene glycol, diethylene glycol or neopentyl glycol or mixtures of two or more thereof. Particularly suitable acids are isophthalic acid or adipic acid or mixtures thereof.

High molecular weight polyester polyols include, for example, the reaction products of polyhydric, preferably dihydric, alcohols (optionally together with small quantities of trihydric alcohols) and polybasic, preferably dibasic, carboxylic acids. Instead of free polycarboxylic acids, the corresponding polycarboxylic anhydrides or corresponding polycarboxylic acid esters with alcohols, preferably $C_{1-3}$ alcohols, may also be used (where possible). The polycarboxylic acids may be aliphatic, cycloaliphatic, aromatic or heterocyclic or both. They may optionally be substituted, for example by alkyl groups, alkenyl groups, ether groups or halogens. Suitable polycarboxylic acids are, for example, succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimer fatty acids or trimer fatty acid or mixtures of two or more thereof. Small quantities of monofunctional fatty acids may optionally be present in the reaction mixture.

The polyesters may optionally contain a small number of terminal carboxyl groups. Polyesters obtainable from lactones, for example based on ε-caprolactone (also known as "polycaprolactones"), or hydroxycarboxylic acids, for example ω-hydroxycaproic acid, may also be used. However, polyester polyols of oleochemical origin may also be used. Oleochemical polyester polyols may be obtained, for example, by complete ring opening of epoxidized triglycerides of a fatty mixture containing at least partly olefinically unsaturated fatty acids with one or more alcohols containing 1 to 12 carbon atoms and subsequent partial transesterification of the triglyceride derivatives to form alkyl ester polyols with 1 to 12 carbon atoms in the alkyl group. Other suitable polyols are polycarbonate polyols and dimer diols (Henkel KGaA) and also castor oil and derivatives thereof. The hydroxyfunctional polybutadienes known, for example, by the commercial name of "Poly-bd" may also be used as polyols for the compositions according to the invention.

Polyacetals are also suitable for use as the polyol component. Polyacetals are understood to be compounds obtainable by reacting glycols, for example diethylene glycol or hexanediol or mixtures thereof, with formaldehyde. Polyacetals suitable for the purposes of the invention may also be obtained by polymerizing cyclic acetals.

Polycarbonates are also suitable or use as the polyol component. Polycarbonates may be obtained, for example, by reacting diols, such as propylene glycol, butane-1,4-diol or hexane-1,6-diol, diethylene glycol, triethylene glycol or tetraethylene glycol or mixtures of two or more thereof, with diaryl carbonates, for example diphenyl carbonate, or phosgene.

Polyacrylates containing OH groups are also suitable for use as the polyol component. OH-functional polyacrylates may be obtained, for example, by polymerizing ethylenically unsaturated monomers bearing an OH group. Such monomers are obtainable, for example, by esterification of ethylenically unsaturated carboxylic acids and dihydric alcohols, the alcohol generally being present in a slight excess. Ethylenically unsaturated carboxylic acids suitable for this purpose are, for example, acrylic acid, methacrylic acid, crotonic acid or maleic acid. Corresponding OH-functional esters are, for example, 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate or mixtures of two or more thereof.

Besides the polyol component, monomeric polyisocyanates, particularly diisocyanates, are key constituents of the polyisocyanates (I) containing urethane groups. These polyisocyanates are compounds with the general structure O=C=N—X—N=C=O where X is an aliphatic, alicyclic or aromatic radical, preferably an aliphatic or alicyclic radical containing 4 to 18 carbon atoms.

Examples of suitable isocyanates are 1,5-naphthylene diisocyanate, 2,4- or 4,4'-diphenylmethane diisocyanate (MDI), hydrogenated MDI ($H_{12}$MDI), xylylene diisocyanate (XDI), tetramethyl xylylene diisocyanate (TMXDI), 4,4'-diphenyl dimethylmethane diisocyanate, di- and tetraalkylene diphenylmethane diisocyanate, 4,4'-dibenzyl diisocyanate, 1,3-phenylene diisocyanate, 1,4-phenylene diisocyanate, the isomers of toluene diisocyanate (TDI), 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanato-1,5,5-trimethyl cyclohexane (IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, phthalic acid-bis-isocyanatoethyl ester; diisocyanates containing reactive halogen atoms, such as 1-chloromethylphenyl-2,4-diisocyanate, 1-bromomethylphenyl-2,6-diisocyanate or 3,3-bis-chloromethylether-4,4'-diphenyl diisocyanate.

Sulfur-containing polyisocyanates are obtained, for example, by reaction of 2 mol hexamethylene diisocyanate with 1 mol thiodiglycol or dihydroxydihexyl sulfide. Other suitable diisocyanates are, for example, trimethyl hexamethylene diisocyanate, 1,4-diisocyanatobutane, 1,12-diisocyanatododecane and dimer fatty acid diisocyanate. Particularly suitable diisocyanates are tetramethylene, hexamethylene, undecane, dodecamethylene, 2,2,4-trimethylhexane-2,3,3-trimethylhexamethylene, 1,3-cyclohexane, 1,4-cyclohexane, 1,3- and 1,4-tetramethyl xylene, isophorone, 4,4-dicyclohexanemethane and lysine ester diisocyanate. Tetramethyl xylylene diisocyanate (TMXDI), more particularly the m-TMXDI obtainable from Cyanamid, is most particularly preferred.

Suitable at least trifunctional isocyanates are polyisocyanates formed by trimerization or oligomerization of diisocyanates or by reaction of diisocyanates with polyfunctional compounds containing hydroxyl or amino groups.

Isocyanates suitable for the production of trimers are the diisocyanates mentioned above, the trimerization products of HDI, MDI, TDI or IPDI being particularly preferred.

Blocked, reversibly capped polykisisocyanates, such as 1,3,5-tris-[6-(1-methylpropylideneaminoxycarbonylamino)-hexyl]-2,4,6-trixohexahydro-1,3,5-triazine, are also suitable.

The polymeric isocyanates formed, for example, as residue in the distillation of diisocyanates are also suitable for use. The polymeric MDI obtainable from the distillation residue in the distillation of MDI is particularly suitable.

In selecting the polyisocyanates, it is important to bear in mind the fact that the NCO groups of the polyisocyanates can differ in their reactivity to compounds containing isocyanate-reactive functional groups. This applies in particular to diisocyanates containing NCO groups in different chemical environments, i.e. to nonsymmetrical diisocyanates. It is known that diisocyanates or generally symmetrical diisocyanates have higher reaction rates than the second isocyanate group of nonsymmetrical or monocyclic diisocyanates. Actual examples are: all isomers of toluene diisocyanate (TDI) either in the form of the pure isomers or mixtures of several isomers; 1-isocyanatomethyl-3-isocyanato-1,5,5-trimethyl diisocyanate (isophorone diisocyanate, IPDI); 2,4-diphenylmethane diisocyanate.

Besides the polyols mentioned thus far, other compounds containing functional groups reactive to isocyanates—for example amines but also water—may also be used for the production of the polyurethane prepolymers containing urethane groups. The following compounds are also mentioned: succinic acid di-2-hydroxyethylamide, succinic acid di-N-methyl-(2-hydroxyethyl)-amide, 1,4-di-(2- hydroxymethylmercapto)-2,3,5,6-tetrachlorobenzene, 2-methylene-1,3-propanediol, 2-methyl-1,3-propanediol, 3-pyrrolidino-1,2-propanediol, 2-methylene-2,4-pentanediol, 3-alkoxy-1,2-propanediol, 2-ethylhexane-1,3-diol, 2,2-dimethyl-1,3-propanediol, 1,5-pentanediol, 2,5-dimethyl-2,5-hexanediol, 3-phenoxy-1,2-propanediol, 3-benzyloxy-1,2-propanediol, 2,3-dimethyl-2,3-butanediol, 3-(4-methoxyphenoxy)-1,2-propanediol and hydroxymethyl benzyl alcohol;

aliphatic, cycloaliphatic and aromatic diamines, such as ethylenediamine, hexamethylenediamine, 1,4-cyclohexylenediamine, piperazine, N-methyl propylenediamine, diaminodiphenyl sulfone, diaminodiphenyl ether, diaminodiphenyl dimethyl methane, 2,4-diamino-6-phenyl triazine, isophoronediamine, dimer fatty acid diamine, diaminodiphenyl methane, aminodiphenylamine or the isomers of phenylenediamine;

carbohydrazides or hydrazides of dicarboxylic acids;

aminoalcohols, such as ethanolamine, propanolamine, butanolamine, N-methyl ethanolamine, N-methyl isopropanolamine, diethanolamine, triethanolamine and higher di- or tri(alkanolamines);

aliphatic, cycloaliphatic, aromatic and heterocyclic mono- and diaminocarboxylic acids, such as glycine, 1- and 2-alanine, 6-aminocaproic acid, 4-aminobutyric acid, the isomeric mono- and diaminobenzoic acids and the isomeric mono- and diaminonaphthoic acids.

According to the invention, the reactive component (I) containing urethane groups contains both at least one urethane structural unit and at least one, preferably two or more, reactive functional groups which are capable of reacting with other functional groups at temperatures of −5° C. to 200° C., optionally in the presence of catalysts, with formation of a covalent bond.

In the context of the invention, preferred functional groups are isocyanate-reactive functional groups such as, for example, —OH; —SH; —NH$_2$; >NH; or such groups as, for example, NCO or epoxide groups.

Component (I) contains
as component (Ia) both NCO groups and NCO-reactive groups,
as component (Ib) NCO groups and
as component (Ic) isocyanate-reactive groups.

After the reactive component (I) containing urethane groups has been mixed with at least one low-monomer polyisocyanate (II) containing urethane groups in step (A), components (Ia) and/or (Ic) are subsequently reacted with (II) in step (B).

The reactive component (I) containing urethane groups contains as component (Ia) both NCO groups and isocyanate-reactive functional groups. Component (Ia) is prepared by reacting at least one nonsymmetrical monomeric polyisocyanate selected from the groups consisting of all isomers of toluene diisocyanate (TDI) either in the form of the pure isomers or mixtures of several isomers; 1-isocyanatomethyl-3-isocyanato-1,5,5-trimethyl diisocyanate (isophorone diisocyanate, IPDI); 2,4-diphenylmethane diisocyanate, with at least one compound containing isocyanate-reactive functional groups, preferably with at least one polyol. The reaction is carried out with an NCO/OH ratio of 1.05 to 1.8:1. The end of the reaction is reached when the more reactive NCO groups of the monomeric polyisocyanate have reacted almost completely with part of the isocyanate-reactive functional groups available while the less reactive NCO groups have not reacted to any significant extent, if at all. This point of the reaction can be determined by analytical monitoring of the course of the reaction. The course of the reaction may be monitored by spectroscopy (IR) or titrimetry. The molar ratios used are selected so that free isocyanate-reactive functional groups, preferably OH groups, are still present after the more reactive isocyanate groups have reacted off. The resulting component (Ia) is characterized by a molecular weight of 500 to 20,000 g/mol, as determined by gel permeation chromatography (GPC). At a temperature of 20° C. to 100° C., (Ia) has a Brookfield viscosity of 500 to 25,000 mPas (ISO 2555). In other words, the viscosity is no lower than 500 mPas at 20° C. and no higher than 25,000 mPas at 100° C. The NCO content is in the range from 1 to 10% by weight, as determined by Spiegelberger's method (EN ISO 11909). Where the non-symmetrical monomeric polyisocyanate is reacted with at least one polyol, the hydroxyl value of (Ia) is in the range from 5 to 50, as measured to ISO 4326.

The reactive component (I) containing urethane groups contains NCO groups as component (Ib) and is obtainable by reacting at least one monomeric polyisocyanate with at least one compound containing isocyanate-reactive functional groups, preferably with at least one polyol. The reaction is carried out with an NCO/OH ratio of 1.05:1 to 3:1, preferably 1.05:1 to 2:1 and more particularly 1.05:1 to 1.2:1. The end of the reaction is reached when the isocyanate-reactive functional groups have almost completely reacted. This point of the reaction can be determined by analytical monitoring of the course of the reaction. The course of the reaction may be monitored by spectroscopy (IR) or titrimetry.

The resulting reactive component (Ib) containing urethane groups is characterized by a molecular weight of 500 to 20,000 g/mol, as determined by gel permeation chromatography (GPC). At a temperature of 20° C. to 100° C., (Ib) has a Brookfield viscosity of 500 to 25,000 mPas (ISO 2555). In other words, the viscosity is no lower than 500 mPas at 20° C. and no higher than 25,000 mPas at 100° C. The NCO content is in the range from 1 to 10% by weight, as determined by Spiegelberger's method (EN ISO 11909). The OH value is zero and the monomer concentration is greater than 0.5% by weight, preferably greater than 1% by weight and more particularly greater than 2% by weight. The monomer concentration is lower than 30% by weight, preferably lower than 20% by weight and more particularly lower than 10% by weight.

In addition, component (Ic) containing isocyanate-reactive functional groups is used as component (I) containing urethane groups. Component (Ic) is obtained by reacting at least one monomeric polyisocyanate with at least one compound containing isocyanate-reactive functional groups, preferably with at least one polyol, in an NCO/OH ratio of 0.1 to 0.8:1 until the isocyanate groups have almost completely reacted. This point of the reaction can be determined by analytical monitoring of the course of the reaction. The course of the reaction may be monitored by spectroscopy (IR) or titrimetry.

The resulting component (Ic) containing isocyanate-reactive functional groups may be characterized by a molecular weight of 500 to 20,000 g/mol, as determined by gel permeation chromatography (GPC). At a temperature of 20° C. to 100° C., (Ic) has a Brookfield viscosity of 500 to 25,000 mPas (ISO 2555). In other words, the viscosity is no lower than 500 mPas at 20° C. and no higher than 25,000 mPas at 100° C. The hydroxyl value (OH value) as determined to ISO 4326 is in the range from 5 to 50. The NCO content is 0% by weight.

The low-monomer polyisocyanate (II) containing urethane groups is obtained by reacting at least one monomeric polyisocyanate with at least one polyol, preferably with at least one diol. In order to avoid the formation of relatively high molecular weight oligomers, a large stoichiometric excess of polyisocyanates over the polyols is preferably selected. An NCO/OH ratio of 2:1 to 10:1 is preferred, an NCO/OH ratio of 3:1 to 7:1 being particularly preferred. The polyisocyanate (II) has an OH value of 0.

Symmetrical diisocyanates and particularly dicyclic diisocyanates are preferably used as the monomeric polyisocyanates.

By "low-monomer" is meant a low concentration of the monomeric polyisocyanates in the polyisocyanate (II). The concentration of these so-called "residual monomers" is below 1% by weight, preferably between 0 and 0.5% by weight and more particularly between 0 and 0.2% by weight, based on the polyisocyanate (II) containing urethane groups.

The low content of monomeric polyisocyanate in the polyisocyanate is achieved by removing the monomeric polyisocyanate from the reaction product after the reaction of polyisocyanate with polyol. The purification step may be carried out by methods known per se, such as distillation, extraction, chromatography or crystallization either individually or optionally in combination.

Where lower alkanediols are used, it has proved to be effective to utilize the poor solubility of the polyisocyanate (II) containing urethane groups in certain solvents by adding a nonsolvent for the polyisocyanate (II) containing urethane groups which, at the same time, is a solvent for the monomeric diisocyanate on completion of the diol/diisocyanate reaction. In this way, the polyisocyanate containing urethane groups is precipitated from the reaction mixture and freed from unreacted monomeric diisocyanate by filtration or centrifuging. This procedure should be applied in particular when the relatively non-volatile monomeric diisocyanates, such as MDI for example, are to be used. Nonsolvents are, in particular, nonpolar aprotic organic solvents such as, for example, ethyl acetate, chlorobenzene, xylenes, toluene or, in particular, special boiling-point spirits.

Where volatile monomeric diisocyanates, such as TDI, MDI, TMXDI, IPDI, XDI for example, are used, the excess monomeric diisocyanate may even be removed from the reaction mixture by distillation. To this end, distillation is preferably carried out in vacuo using a thin-layer evaporator or a thin-film evaporator. Distillation processes such as these are described, for example, in Kunststoff-Handbuch, Vol. 7, "Polyurethane", G. W. Becker (Ed.)., Hanser-Verlag, München, 3rd Edition 1993, page 425.

Another method of removing the monomeric diisocyanate from the reaction mixture is selective extraction of the monomeric diisocyanate, for example using supercritical carbon dioxide or other supercritical aprotic solvents. This extraction process is known, for example, from WO 97/46603.

The polyurethane prepolymer according to the invention is prepared by
preparing at least one reactive component (I) containing urethane groups in a first reaction step as
a) component (Ia) by reacting at least one nonsymmetrical monomeric polyisocyanate with at least one compound containing isocyanate-reactive functional groups in an NCO/OH ratio of 1.05 to 1.8:1 until the more reactive NCO groups of the monomeric polyisocyanate have reacted almost completely with part of the isocyanate-reactive functional groups available and/or
b) preparing a component (Ib) by reacting at least one monomeric polyisocyanate with at least one compound containing isocyanate-reactive functional groups in an NCO/OH ratio of 1.05 to 3:1 until the isocyanate-reactive functional groups have almost completely reacted and/or
c) preparing a component (Ic) by reacting at least one monomeric polyisocyanate with at least one compound containing isocyanate-reactive functional groups in an NCO/OH ratio of 0.1 to 0.8:1 until the isocyanate groups have almost completely reacted;
by preparing at least one low-monomer polyisocyanate (II) containing urethane groups in a second step by reacting at least one monomeric polyisocyanate with at least one polyol in an NCO/OH ratio of 2:1 to 10:1, subsequently removing unreacted monomeric polyisocyanate and then mixing the reactive component (I) containing urethane groups and polyisocyanate (II); in cases a) and c), the low-monomer polyisocyanate (II) containing urethane groups being added and allowed to react in excess, based on the free isocyanate-reactive functional groups of component (Ia) or (Ic) containing urethane groups and
the production of components (I), (II) and the reaction products of (Ia) and (Ic) being carried out by any method known to the expert under the general rules of polyurethane production.

The percentage by weight of the reactive component (I) containing urethane groups in the (reaction) mixture of (I) with polyisocyanate (II) is in the range from 20 to 90% by weight, preferably in the range from 50 to 90% by weight and more particularly in the range from 70 to 90% by weight.

The production of reactive component (I) containing urethane groups and polyisocyanate (II) and the reaction of (Ia) and/or (Ic) with (II) may be carried out, for example, in the presence of solvents. Basically, suitable solvents are any of the solvents typically used in polyurethane chemistry, more particularly esters, ketones, halogenated hydrocarbons, alkanes, alkenes and aromatic hydrocarbons. Examples of such solvents are methylene chloride, trichloroethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, diisobutyl ketone, dioxane, ethyl acetate, ethylene glycol monobutyl ether acetate, ethylene glycol monoethyl acetate, 2-ethyl hexyl acetate, glycol diacetate, heptane, hexane, isobutyl acetate, isooctane, isopropyl acetate, methyl ethyl ketone, tetrahydrofuran or tetrachloroethylene or mixtures of two or more of the solvents mentioned.

If the reaction components are themselves liquid or if at least one or more of the reaction components form a solution or dispersion of other, sufficiently liquid reaction components, there is no need at all to use solvents. A solventless reaction is preferred for the purposes of the invention.

To accelerate the reaction for preparing component (I), (II) and optionally the reaction product of (Ia) or (Ic), the temperature is normally increased. In general, the reaction mixture is heated to around 40 to 80° C. The exothermic reaction which begins then provides for an increase in temperature. The temperature of the reaction mixture is kept at about 70 to about 110° C., for example at about 85 to 95° C. or more particularly at about 75 to about 85° C. If necessary, the temperature may be regulated by suitable external measures, for example heating or cooling.

Catalysts widely used in polyurethane chemistry may optionally be added to the reaction mixture to accelerate the reaction. Dibutyl tin dilaurate or diazabicyclooctane (DABCO) is preferably added. Where it is desired to use a catalyst, the catalyst is generally added to the reaction mixture in a quantity of about 0.005% by weight or about 0.01 to about 0.2% by weight, based on the mixture as a whole.

The reaction time depends upon the polyol component used, the monomeric polyisocyanate used, other compounds containing isocyanate-reactive functional groups, the reaction temperature and the catalyst present, if any. The total reaction time is normally about 30 minutes to about 20 hours.

Mixing of the reactive component (I) containing urethane groups, more particularly component (Ib), with polyisocyanate (II) to homogeneity is carried out at a temperature of 20° C. to 100° C. and preferably at a temperature of 40° C. to 80° C., optionally in the presence of the solvents already mentioned and optionally in an inert gas atmosphere.

In one particular embodiment, the educts for the preparation of the reactive component (I) containing urethane groups and the polyisocyanate (II) are identical, particularly when the NCO component (Ib) is used as the component (I) containing urethane groups. In this embodiment, component (Ib) is prepared first and, after a desired NCO content or a desired viscosity has been reached, 20 to 90% by weight of the component is removed. More monomeric polyisocyanate is added to the remainder up to an NCO/OH ratio of 2:1 to 10:1 and the reaction is continued until a desired NCO content or a desired viscosity has been reached. Unreacted monomeric polyisocyanate is then removed by at least one of the described processes or a combination thereof. The quantity of the reactive component (Ib) containing urethane groups previously removed is then added to the low-monomer polyisocyanate (II) containing urethane groups thus obtained.

The particular advantage of the polyurethane prepolymer according to the invention is that low-monomer and—where component (Ic) containing isocyanate-reactive functional groups is reacted—even monomer-free, high-NCO PU prepolymers "tailored" in their viscosity to the application envisaged can be produced by reacting the terminal NCO groups of a low-viscosity, low-monomer reaction medium, the polyisocyanate (II) containing urethane groups, with
a) isocyanate-reactive functional groups still present in a relatively high molecular weight reaction medium, component (Ia) or (Ic), and/or
b) mixing with component (Ib).

The polyurethane prepolymer according to the invention containing free isocyanate groups and little monomeric polyisocyanate preferably has a monomeric polyisocyanate content of less than 2% by weight or less than 1% by weight or preferably less than 0.5% by weight. These limits apply in particular to readily volatile isocyanate compounds which represent only a limited potential health risk to the people involved in their processing, for example to isophorone diisocyanate (IPDI), hexamethylene diisocyanate (HDI), tetramethyl xylylene diisocyanate (TMXDI) or cyclohexane diisocyanate. The content of certain readily volatile isocyanate compounds, particularly those which represent a serious health risk to the people involved in their processing, in the PU prepolymer composition according to the invention is preferably less than 0.3% by weight and more preferably less than 0.1% by weight. Isocyanate compounds such as these include, in particular, toluene diisocyanate (TDI). In another preferred embodiment of the invention, the polyurethane prepolymer has a content of monomeric polyisocyanate, more particularly MDI and/or TDI, of less than 0.07% by weight.

The polyurethane prepolymer with a low monomeric polyisocyanate content thus produced is used—preferably together with typical hardeners and/or moisture and optionally in the presence of organic solvents and typical accelerators and additives—for bonding plastics, metals and paper, especially films and more particularly in flexible packaging, bonding preferably being carried out at temperatures of 20 to 120° C.

The polyurethane prepolymer according to the invention is distinguished by the following positive or advantageous properties:

It has a low viscosity, particularly for flexible packaging, a low viscosity being understood to be a Brookfield viscosity (as measured to ISO 2555) in the range from 100 mPas to 25,000 mPas, preferably up to 10,000 mPas and more particularly in the range from 250 to 5,000 mPas at 100° C.

It has a high isocyanate content of 1 to 10% by weight and preferably in the range from 2 to 7% by weight.

The monomer content of unreacted monomeric polyisocyanate, also known generally as the residual monomer content, can be well below 1% by weight.

No anti-sealing effects occur.

It is completely free from migrates.

The absence of migrates is determined as follows (see Deutsche Lebensmittel-Rundschau, 87 (1991), pages 280 and 281):

A welded flat bag is filled with 3% acetic acid and stored at 70° C. After storage for 2 hours, the contents of the bag are diazotized, subjected to azo coupling and concentrated in a $C_{18}$ column. The concentration is then photometrically determined. The migration of nonvolatile diisocyanates and other compounds can cause problems, for example in the sealing of bonded film laminates, especially CPA/EVA laminates.

The PU prepolymers according to the invention are suitable as such or as a solution in organic solvents for bonding plastics, metals and papers, more particularly for laminating aluminium foils and plastic films and metallized or oxide-coated films and papers. Typical hardeners, for example polyhydric, relatively high molecular weight alcohols (2-component systems), may be added or surfaces with a defined moisture content are directly bonded with the products according to the invention. Film laminates produced with the products according to the invention are very safe to heat-seal. This may possibly be attributable to the greatly reduced percentage content of migratable low molecular weight products in the prepolymers.

The invention is illustrated by the following Examples.
I Production and Properties of the PU Prepolymers

I.1 EXAMPLE A

Preparation of Component (Ia):

In an apparatus known to the expert, water was removed from a mixture of 34% by weight of a polyester diol consisting of adipic acid, diethylene glycol and dipropylene glycol (OH value 135) and 16% by weight of a polyether diol (OH value 188) at 80° C. After cooling to 40° C., 17% by weight of TDI (Desmodur T 100, Bayer AG) were added to the water-free polyester/polyether mixture (addition ratio in this stage 1.05 to 1.6:1), the reaction temperature not being allowed to exceed 70° C. The end of the reaction was reached at an NCO titration value of 3.4%.

Further Processing:

In a second stage, 33% by weight of the low-monomer polyisocyanate (II) containing urethane groups were added.
Preparation of the Low-Monomer Polyisocyanate (II) Containing Urethane Groups:

In an apparatus known to the expert, a polyether diol (OH value 130) was heated to 40° C. and mixed with 4,4'-diphenylmethane diisocyanate (MDI, Desmodur 44M, Bayer AG) in an NCO/OH ratio of 3:1 and the resulting mixture was heated with stirring, the reaction temperature not being allowed to exceed 80° C. After stirring for the usual time (for example 1.5 to 2 hours for a 2 kg batch), the residual MDI was distilled off in a thin-layer distillation apparatus. After distillation, the NCO titration value was 6.1%.

Reaction of Component (Ia) with the Low-Monomer Polyisocyanate (II) Containing Urethane Groups:

In an apparatus known to the expert, component (Ia) prepared as described above was mixed with the low-monomer polyisocyanate (II) containing urethane groups in the ratios by weight mentioned above (addition ratio in this stage 0.15 to 0.55:1) and the resulting mixture was heated with stirring, the reaction temperature not being allowed to exceed 80° C. The end of the reaction was reached at an NCO titration value of 4.4% (theoretical value 4.3%).

The Brookfield viscosity (spindle 27, 30 r.p.m., 70° C.) was 4,520 mPas. The free monomeric polyisocyanate content was 0.06% by weight TDI and under 0.02% by weight MDI.

I.2 EXAMPLE B

Preparation of Component (Ia):

In an apparatus known to the expert, water was removed from a mixture of 32.5% by weight of a polyester diol consisting of adipic acid, isophthalic acid, phthalic acid, diethylene glycol and dipropylene glycol (OH value 130) and 32.5% by weight of a polyether diol (OH value 188) at 80° C. After cooling to 40° C., 22% by weight of TDI (Desmodur T 100, Bayer AG) were added to the water-free polyester/polyether mixture (addition ratio in this stage 1.26 to 1.66:1), the reaction temperature not being allowed to exceed 75° C. The end of the reaction was reached at an NCO titration value of 3.8%.

In a second stage, 12% by weight of the low-monomer polyisocyanate (II) containing urethane groups were added. Preparation of the Low-Monomer Polyisocyanate (II) Containing Urethane Groups:

In an apparatus known to the expert, a polyether diol (OH value 130) was heated to 40° C. and mixed with 4,4'-diphenylmethane diisocyanate (MDI, Desmodur 44M, Bayer AG) in an NCO/OH ratio of 3:1 and the resulting mixture was heated with stirring, the reaction temperature not being allowed to exceed 80° C. After stirring for the usual time (for example 1.5 to 2 hours for a 2 kg batch), the residual MDI was distilled off in a thin-layer distillation apparatus. After distillation, the NCO titration value was 6.1%.

Reaction of Component (Ia) with the Low-Monomer Polyisocyanate (II) Containing Urethane Groups:

In an apparatus known to the expert, component (Ia) prepared as described above was mixed with the low-monomer polyisocyanate (II) containing urethane groups in the ratios by weight mentioned above (addition ratio in this stage 0.1:1) and the resulting mixture was heated with stirring, the reaction temperature not being allowed to exceed 80° C. The end of the reaction was reached at an NCO titration value of 4.1% (theoretical value 4.1%).

The Brookfield viscosity (spindle 27, 30 r.p.m., 70° C.) was 4,900 mPas. The free monomeric polyisocyanate content was 0.02% by weight MDI and under 0.02% by weight TDI.

I.3 COMPARISON EXAMPLE 1

In a three-necked flask equipped with a stirrer, thermometer and drying tube, 575.3 g of a polypropylene glycol (OH value 109) and 156.9 g of a polypropylene glycol (OH value 267) were mixed with 238.5 g of 2,4-toluene diisocyanate and the resulting mixture was heated with stirring. Before a melt temperature of 90° C. was reached, the NCO titration value reached after half an hour was just below 4.5%. After addition of 28 g of 4,4'-diphenylmethane diisocyanate, stirring was continued for two hours at 90° C., after which the NCO content had reached 4.57% (theoretical value 4.59%).

| % monomeric TDI: 0.03 | % NCO: 4.57 (theoretical 4.59) |
|---|---|
| % monomeric MDI: 0.2 | OH/NCO (stage 1) = 0.68:1 |

OH/NCO (Stage 2)=10:1, Based on Residual OH from Stage 1

The Brookfield viscosity (spindle 27, 30 r.p.m., 70° C.) was 1,000 mPas.

I.4 COMPARISON EXAMPLE 2

In a three-necked flask equipped with a stirrer, thermometer and drying tube, 411.7 g of a polypropylene glycol (OH value 109) were mixed with 104.4 g of 2,4-toluene diisocyanate and the resulting mixture was heated with stirring. Before a melt temperature of 90° C. was reached, an NCO titration value of 4.56% was reached after half an hour. This was just below the theoretical value of 4.88%. After addition of 25 g of 4,4'-diphenylmethane diisocyanate, stirring was continued for two hours at 90° C., after which the NCO content had reached 4.61% (theoretical value 4.65%).

| % monomeric TDI: 0.03 | % NCO: 4.7 (theoretical 4.77) |
|---|---|
| % monomeric MDI: 2.5 | OH/NCO (stage 1) = 1:1 |

OH/NCO (Stage 2)=1:1.6, Based on Residual OH from Stage 1

The Brookfield viscosity (spindle 27, 30 r.p.m., 60° C.) was 1,980 mPas.

I.5 EXAMPLE C

Preparation of Component (Ib):

In an apparatus known to the expert, water was removed from 63.5% by weight of a polyether diol (OH value 188) at 80° C. After cooling to 40° C., 36.5% by weight of TDI (Desmodur T 100, Bayer AG) were added to the water-free polyether diol (addition ratio in this stage 3:1), the reaction temperature not being allowed to exceed 80° C. The end of the reaction was reached at an NCO titration value of 8.8% (theoretical value 8.8%).

Preparation of the Low-Monomer Polyisocyanate (II) containing urethane Groups:

In an apparatus known to the expert, a polyether diol (OH value 130) was heated to 40° C. and mixed with 4,4'-diphenylmethane diisocyanate (MDI, Desmodur 44M, Bayer AG) in an NCO/OH ratio of 3:1 and the resulting mixture was heated with stirring, the reaction temperature not being allowed to exceed 80° C. After stirring for the usual time (for example 1.5 to 2 hours for a 2 kg batch), the residual MDI was distilled off in a thin-layer distillation apparatus. After distillation, the NCO titration value was 6.1%.

Preparation of the Mixture of Component (Ib) and the Low-Monomer Polyisocyanate (II) Containing Urethane Groups:

In an apparatus known to the expert, 80% by weight of component (Ib) prepared as described above were mixed with 20% by weight of the low-monomer polyisocyanate (II) containing urethane groups and the resulting mixture was homogenized by stirring and heating, the temperature of the mixture not being allowed to exceed 70° C. The homogeneous mixture had an NCO titration value of 8.2% (theoretical value 8.3%).

The Brookfield viscosity (spindle 27, 30 r.p.m., 50° C.) was 5,000 mPas. The free monomeric polyisocyanate content was under 0.02% by weight (MDI monomer content) or 0.7% by weight (TDI monomer content).

I.6 EXAMPLE D

Preparation of Component (Ic):

In an apparatus known to the expert, water was removed from 32% by weight of a polyester diol consisting of adipic acid, diethylene glycol, dipropylene glycol, isophthalic acid and phthalic acid (OH value 125) at 80° C. After cooling to 40° C., 5% by weight of 4,4'-diphenylmethane diisocyanate (MDI, Desmodur 44 M, Bayer AG) were added to the water-free polyester mixture (addition ratio in this stage 0.4 to 0.6:1), the reaction temperature not being allowed to exceed 80° C. The end of the reaction was reached at an NCO titration value of 0%.

Further Processing:

In a second stage, 63% by weight of the low-monomer polyisocyanate (II) containing urethane groups were added.

Preparation of the low-monomer polyisocyanate (II) containing urethane groups:

In an apparatus known to the expert, a polyether diol (OH value 130) was heated to 40° C. and mixed with 4,4'-diphenylmethane diisocyanate (MDI) in an NCO/OH ratio of 3:1 and the resulting mixture was heated with stirring, the reaction temperature not being allowed to exceed 80° C. After stirring for the usual time (for example 1.5 to 2 hours for a 2 kg batch), the residual MDI was distilled off in a thin-layer distillation apparatus. After distillation, the NCO titration value was 6.1%.

Reaction of Component (Ic) with the Low-Monomer Polyisocyanate (II) Containing Urethane Groups:

In an apparatus known to the expert, component (Ic) prepared as described above was mixed with the low-monomer polyisocyanate (II) containing urethane groups in the ratios by weight mentioned above (addition ratio in this stage 1.0 to 1.4:1) and the resulting mixture was heated with stirring, the reaction temperature not being allowed to exceed 80° C. The end of the reaction was reached at an NCO titration value of 2.0% (theoretical value 2.3%).

The Brookfield viscosity (spindle 27, 30 r.p.m., 70° C.) was 22,500 mPas. The free monomeric polyisocyanate content (MDI monomer content) was under 0.02%.

II. Adhesive Tests of the PU Prepolymers

II. a)

For the adhesive tests, laminating experiments were carried out on a Polytype laminating machine.

To this end, the polyurethane prepolymers according to the invention of Examples A+B were mixed with a polyester-polyether polyol (Liofol UR 6067-27, Henkel KGaA, OH value 255) in a ratio of 9:1 for Example A and 8.5:1 for Example B and the resulting mixture was applied at 70° C. in a quantity of 2 g/m². The following materials were laminated:

CPP (cast polypropylene)/aluminium film with a film thickness of 50 micrometers/12 micrometers, polyethylene film (LLDPE film) with a film thickness of 70 micrometers, CPA (cast polyamide) film with a film thickness of 40 micrometers, polyethylene film (LDPE film with white pigment) with a film thickness of 35 micrometers.

Laminate adhesion and sealing seam adhesion were measured on 15 mm wide strips using a Zwick Z2.5 universal tensile testing machine (test speed: 100 mm/min., peel angle 90°).

The results are expressed in N/15 mm and, for Example A, are listed in Table 1 (Tab. 1) for the CPP/aluminium-LLDPE film laminate and in Table 2 (Tab. 2) for the CPA/LDPE film laminate and, for example B, are listed in Table 3 (Tab. 3) for the CPP/aluminium-LLDPE film laminate and in Table 4 (Tab. 4) for the CPA/LDPE film laminate.

II. b)

For the adhesive tests, laminating experiments were carried out on a Polytype laminating machine.

To this end, the polyurethane prepolymer according to the invention of Example C was mixed with a polyester-polyether polyol (Liofol UR 6070, Henkel KGaA, OH value 142) in a ratio of 100:65 and the resulting mixture was applied at 80° C. in a quantity of 2 g/m². The following materials were laminated:

polyethylene terephthalate (PET)/aluminium film with a film thickness of 12 micrometers/12 micrometers, polyethylene film (LLDPE film) with a film thickness of 70 micrometers, CPA (cast polyamide) film with a film thickness of 40 micrometers, polyethylene film (LDPE film) with a film thickness of 35 micrometers.

Laminate adhesion and sealing seam adhesion were measured on 15 mm wide strips using a Zwick Z2.5 universal tensile testing machine (test speed: 100 mm/min., peel angle 90°).

The results are expressed in N/15 mm and are listed in Table 5 (Tab. 5) for the measurement of the inner layer of PET/aluminium-PE (LLDPE) and in Table 6 (Tab. 6) for the measurement of CPA-LDPE.

II. c)

For the adhesive tests, laminating experiments were carried out on a Polytype laminating machine.

To this end, the polyurethane prepolymer according to the invention of Example D was mixed with a polyester-polyether polyol (Liofol UR 6067-27, Henkel KGaA, OH value 255) in a ratio of 17:1 and the resulting mixture was applied at 90° C. in a quantity of 2 g/m². The following materials were laminated:

CPP (cast polypropylene)/aluminium film with a film thickness of 50 μm/12 μm, polyethylene film (LLDPE film) with a film thickness of 70 μm.

Laminate adhesion and sealing seam adhesion of the inner layer of CPP/aluminium-PE were measured on 15 mm wide strips using a Zwick Z2.5 universal tensile testing machine (test speed: 100 mm/min., peel angle 90°).

The results are expressed in N/15 mm and are listed in Table 7 (Table 7).

III. Results

TABLE 1

| Curing | Laminate adhesion | Sealing seam adhesion |
| --- | --- | --- |
| 3 days | 1.0 N/15 mm | 18.6 N/15 mm |
| 7 days | 1.2 N/15 mm | 22.6 N/15 mm |
| 14 days | 3.1 N/15 mm | 23.1 N/15 mm |

TABLE 2

| Curing | Laminate adhesion | Sealing seam adhesion |
| --- | --- | --- |
| 3 days | 3.4 N/15 mm | 20.2 N/15 mm |
| 7 days | 4.8 N/15 mm | 26.0 N/15 mm |
| 14 days | 6.3 N/15 mm | 35.4 N/15 mm |

TABLE 3

| Curing | Laminate adhesion | Sealing seam adhesion |
| --- | --- | --- |
| 3 days | 4.3 N/15 mm | 28.1 N/15 mm |
| 7 days | 3.7 N/15 mm | 22.4 N/15 mm |
| 14 days | 3.1 N/15 mm | 22.2 N/15 mm |

TABLE 4

| Curing | Laminate adhesion | Sealing seam adhesion |
| --- | --- | --- |
| 3 days | 3.8 N/15 mm | 21.8 N/15 mm |
| 7 days | 6.1 N/15 mm | 32.6 N/15 mm |
| 14 days | 5.8 N/15 mm | 40.6 N/15 mm |

TABLE 5

| Curing | Laminate adhesion | Sealing seam adhesion |
| --- | --- | --- |
| 4 days | 2.0 N/15 mm | 41.0 N/15 mm |
| 7 days | 7.3 N/15 mm | 40.0 N/15 mm |
| 11 days | 7.9 N/15 mm | 43.0 N/15 mm |
| 14 days | 7.8 N/15 mm | 43.5 N/15 mm |

TABLE 6

| Curing | Laminate adhesion | Sealing seam adhesion |
| --- | --- | --- |
| 4 days | 9.5 N/15 mm | 43.0 N/15 mm |
| 7 days | 6.2 N/15 mm | 38.0 N/15 mm |
| 11 days | 6.4 N/15 mm | 40.0 N/15 mm |
| 14 days | 6.4 N/15 mm | 40.6 N/15 mm |

TABLE 7

| Curing | Laminate adhesion | Sealing seam adhesion |
| --- | --- | --- |
| 3 days | 7.3 N/15 mm | 43.3 N/15 mm |
| 7 days | 9.0 N/15 mm | 36.8 N/15 mm |
| 14 days | 8.9 N/15 mm | 44.1 N/15 mm |

The laminated films were stored and tested at room temperature.

IV Description of the Test Methods

Determination of the monomeric polyisocyanate in the polyurethane prepolymers according to the invention was carried out by gel permeation chromatography (GPC) or by high-performance liquid chromatography (HPLC) using an in-house method.

The viscosity data were determined with a Brookfield Digital Viscometer RVTDV-II, spindle 27, to ISO 2555.

The hydroxyl value (OH value) was determined to ISO 4326

The NCO content was determined titrimetrically by Spiegelberger's method (EN ISO 11909).

What is claimed is:

1. A polyurethane prepolymer comprising an NCO content of 2% by weight to 10% by weight (as determined by Spiegelberger's method, EN ISO 11909), an OH value of 0 and a monomeric polyisocyanate content of at most 2% by weight produced by the process of
   A) mixing
      I) at least one reactive component (I) containing urethane groups with
      II) at least one low-monomer polyisocyanate (II) containing urethane groups, the low-monomer polyisocyanate (II) containing urethane groups produced by reacting at least one monomeric polyisocyanate with at least one polyol in an NCO:OH ratio of 2:1 to 10:1 and subsequently removing unreacted monomeric polyisocyanate,
   wherein the percentage by weight of the reactive component (I) containing urethane groups in the mixture of component (I) and polyisocyanate (II) is in the range from 20 to 90% by weight,
   B) and, optionally reacting components (I) and (II);
   wherein component (I) contains at least one of:
      both NCO groups and isocyanate-reactive functional groups as component (Ia);
      NCO groups as component (Ib) and is characterized by:
         i) a molecular weight of 500 to 20,000 g/mol, as determined by gel permeation chromatography (GPC),
         ii) a Brookfield viscosity of 500 to 25,000 mPas (ISO 2555) at a temperature of 20° C. to 100° C.,
         iii) an NCO content in the range from 1 to 10% by weight, as determined by Spiegelberger's method (EN ISO 11909),
         iv) an OH value of 0, and
         v) a monomer concentration of greater than 2% by weight;
      isocyanate-reactive functional groups as component (Ic) and is characterized by;
         i) a molecular weight of 500 to 20,000 g/mol, as determined by gel permeation chromatography (GPC),
         ii) a Brookfield viscosity of 500 to 25,000 mPas at a temperature of 20° C. to 100° C., as determined by ISO 2555
         iii) an OH value as determined by ISO 4326 in the range from 5 to 50 and
         iv) an NCO content of 0.

2. The polyurethane prepolymer of claim 1 wherein the monomeric polyisocyanate content is at most 1% by weight.

3. The polyurethane prepolymer of claim 1 wherein the prepolymer has a Brookfield viscosity at 100° C. of 100 mPas to 25,000 mPas, as measured to ISO 2555.

4. The polyurethane prepolymer of claim 1 wherein component (I) containing urethane groups contains both NCO groups and isocyanate-reactive functional groups as component (Ia).

5. The polyurethane prepolymer of claim 4 wherein component (Ia) is obtained by reacting at least one compound containing isocyanate-reactive functional groups with at least one nonsymmetrical monomeric polyisocyanate selected from the group consisting of all isomers of toluene diisocyanate (TDI) either in the form of the pure isomers or mixtures of several isomers; 1-isocyanatomethyl-3-isocyanato-1,5,5-trimethyldiisocyanate (isophorone diisocyanate, IPDI); 2,4-diphenylmethane diisocyanate.

6. The polyurethane prepolymer of claim 4 wherein component (Ia) is characterized by:
   a) a molecular weight of 500 to 20,000 g/mol, as determined by gel permeation chromatography (GPC), b) a Brookfield viscosity of 500 to 25,000 mPas (ISO 2555) at a temperature of 20° C. to 100° C., c) an NCO content in the range from 1 to 10% by weight, as determined by Spiegelberger's method (EN ISO 11909) and d) an OH value in the range from 5 to 50, as measured by ISO 4326.

7. The polyurethane prepolymer of claim 1 wherein component (I) containing urethane groups contains NCO groups as component (Ib) and is characterized by:

a) a molecular weight of 500 to 20,000 g/mol, as determined by gel permeation chromatography (GPC), b) a Brookfield viscosity of 500 to 25,000 mPas (ISO 2555) at a temperature of 20° C. to 100° C., c) an NCO content in the range from 1 to 10% by weight, as determined by Spiegelberger's method (EN ISO 11909), d) an OH value of 0, and e) a monomer concentration of greater than 2% by weight.

8. The polyurethane prepolymer of claim 1 wherein component (I) containing urethane groups contains isocyanate-reactive functional groups as component (Ic) and is characterized by:

a) a molecular weight of 500 to 20,000 g/mol, as determined by gel permeation chromatography (GPC), b) a Brookfield viscosity of 500 to 25,000 mPas at a temperature of 20° C. to 100° C., as determined by ISO 2555 c) an OH value as determined by ISO 4326 in the range from 5 to 50 and d) an NCO content of 0.

9. The polyurethane prepolymer of claim 1 wherein the low-monomer polyisocyanate (II) containing polyurethane groups has an unreacted monomeric polyisocyanate content of 0 to 0.5% by weight, based on (II), and an OH value of 0.

10. A process for the production of the polyurethane prepolymer claimed in claim 1 comprising the steps of:

preparing at least one reactive component (I) containing urethane groups in a first reaction step as a) component (Ia) by reacting at least one nonsymmetrical monomeric polyisocyanate with at least one compound containing isocyanate-reactive functional groups in an NCO/OH ratio of 1.05 to 1.8:1 until the more reactive NCO groups of the monomeric polyisocyanate have reacted almost completely with part of the isocyanate-reactive functional groups available and/or b) preparing component (Ib) by reacting at least one monomeric polyisocyanate with at least one compound containing isocyanate-reactive functional groups, preferably with at least one polyol, in an NCO/OH ratio of 1.05 to 3:1 until the isocyanate-reactive functional groups have almost completely reacted and/or c) preparing component (Ic) by reacting at least one monomeric polyisocyanate with at least one compound containing isocyanate-reactive functional groups in an NCO/OH ratio of 0.1 to 0.8:1 until the isocyanate groups have almost completely reacted; and preparing at least one low-monomer polyisocyanate (II) containing urethane groups in a second step by reacting at least one monomeric polyisocyanate with at least one polyol in an NCO/OH ratio of 2:1 to 10:1, subsequently removing unreacted monomeric polyisocyanate and then mixing the reactive component (I) containing urethane groups and polyisocyanate (II); in steps a) and c), the low-monomer polyisocyanate (II) containing urethane groups being added and allowed to react in excess, based on the free isocyanate-reactive functional groups of component (Ia) or (Ic) containing urethane groups.

11. A process for the production of the monomeric polyisocyanate (II) containing urethane groups of claim 10 wherein the excess monomeric diisocyanate is removed from the reaction mixture by distillation, extraction, chromatographic or crystallization processes either individually or optionally in combination with one another.

12. A method of bonding plastics, metals or paper comprising applying the polyurethane prepolymer produced in accordance with claim 1 in combination with hardeners and/or moisture and optionally in the presence of organic solvents, accelerators and additives, onto the surfaces of the plastic, metal or paper.

13. A method of bonding plastics, metals or paper comprising applying the polyurethane prepolymer produced in accordance with claim 10 in combination with hardeners and/or moisture and optionally in the presence of organic solvents, accelerators and additives, onto the surfaces of the plastic, metal or paper.

14. A method of bonding flexible packaging comprising applying the polyurethane prepolymer of claim 1 onto the surface of the flexible packaging.

15. A bonded article of manufacture produced in accordance with the process of claim 12.

16. A bonded article of manufacture produced in accordance with the process of claim 13.

17. A bonded article of manufacture produced in accordance with the process of claim 14.

* * * * *